April 27, 1965     R. D. ERICKSON     3,181,171
INDICATING AND RECORDING APPARATUS
Filed May 31, 1962
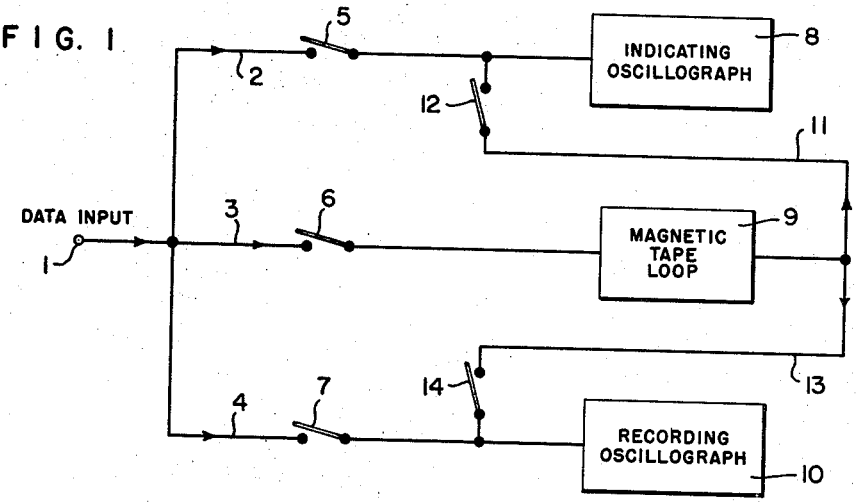
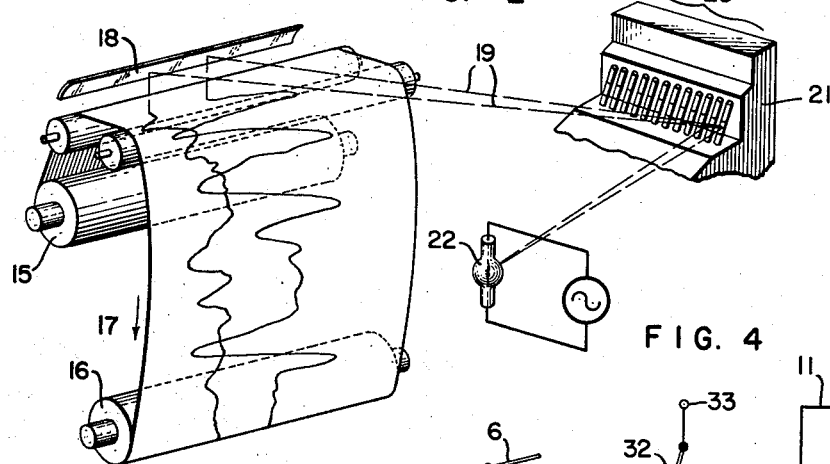
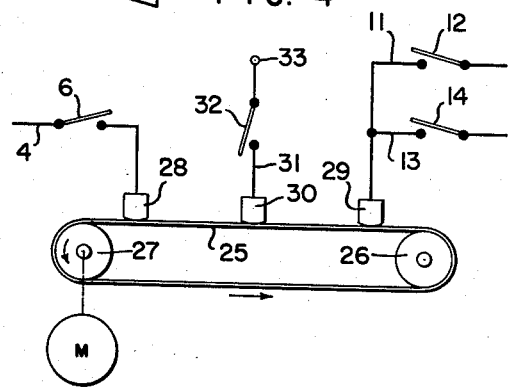
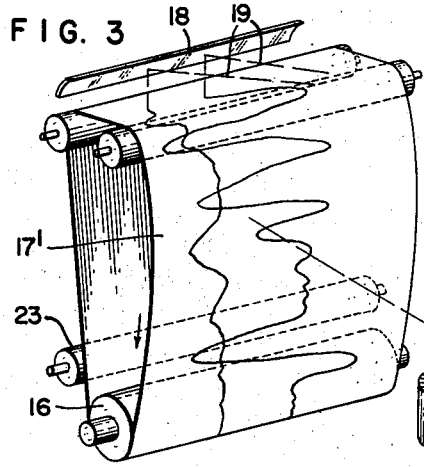
INVENTOR.
ROGER D. ERICKSON
BY Arthur H. Swanson
ATTORNEY.

United States Patent Office 3,181,171
Patented Apr. 27, 1965

3,181,171
INDICATING AND RECORDING APPARATUS
Roger D. Erickson, Littleton, Colo., assignor to
Honeywell Inc., a corporation of Delaware
Filed May 31, 1962, Ser. No. 199,055
9 Claims. (Cl. 346—109)

A general object of the present invention is to provide a novel and useful combination of oscillographic apparatus components which provides a visually observable display of the recent history of a continuing phenomenon, and which permits, at the judgment of the observer, data of no value to be discarded, and data of interest to be repetitively and exhaustively examined, and, if desired, recorded for subsequent detailed analysis.

In the gathering of data, a common problem of scientific investigators is the selective discard of unwanted material. The data gathered often is voluminous and indicates only that the phenomenon or system under study is continuing to do that which it had been doing some time previously. In some investigations, such information may be useful, but in others, particularly when standard conditions have been established and are known, serve little useful purpose and can be discarded. That is to say, once standard conditions have been established, the data of interest in scientific analysis usually is that which deviates from the regular order.

A more specific object of the present invention is to provide a novel oscillographic apparatus combination which permits immediate online observation of transient phenomenon or data as it occurs and repetitive re-examination of a portion or all of such data, as desired, with provision for making a permanent record of selected data for subsequent study and analysis. This apparatus combination permits the observer to examine the phenomenon in its continuing state, and to re-examine interesting portions of the data representing the phenomenon as the latter has been undergoing change, and to make a decision to permanently record such data or to discard it.

In accordance with the present invention, the oscillographic combination provided comprises an indicating oscillographic device providing a temporary indication for "quick look" at input data applied to it, a magnetic tape loop storage device which is operative to store data indefinitely or for a period of time, as is desired, and a recording oscillographic device for making a permanent record of selected data. Suitable switches are provided for selectively applying the input data to either of the three devices, and additionally, a pair of switches are provided for selectively connecting the output of the magnetic tape loop storage device either to the input of the indicating oscillographic device or to the input of the recording oscillographic device. For example, with only the input switches closed to the indicating oscillographic device and the magnetic tape loop storage device, the apparatus is operative to provide the operator with a "quick look" of the input data. If interesting data are observed, the operator may open the said two switches and close the switch from the output of the magnetic tape loop storage to the input of the indicating oscillograph. With this connection, the apparatus is so adjusted that the operator can repeatedly examine such data of interest. If the operator finds the data sufficiently interesting, he can make a permanent record of it by closing the switch from the output of the magnetic tape loop device to the input of the permanent recording oscillograph.

In accordance with another feature of the invention, it is contemplated that two or more channels of information may be applied simultaneously to the indicating oscillographic device, the magnetic tape loop storage device, and the recording oscillographic device. Thus, in the event of interesting data, the operator by suitable manipulation of the switches can re-examine data on one channel of the indicating oscillographic device, while continuing to observe new data coming in, now on a new channel, in the indicating oscillograph.

In accordance with still another feature of the invention, it is contemplated that the indicating and recording oscillographs can be modified to provide so-called "X–Y" displays and displays in which the radiation intensity is modulated. With such a construction, information relating to scanning devices can be displayed, such as radar displays, sonar displays, thermal photographs, and so forth.

A better understanding of the present invention may be had from the following detailed description when read in connection with the accompanying drawings, in which:

FIG. 1 is a diagrammatic showing of the oscillographic indicating and recording combination of the present invention;

FIG. 2 is a diagrammatic showing of a form of recording oscillographic device which may be employed in the practice of the present invention for making permanent records of data;

FIG. 3 is a diagrammatic showing of a modification of FIG. 2, providing an endless belt form of indicating oscillographic device; and FIG. 4 is a diagrammatic showing of a multiple-track magnetic tape loop storage device which may be employed in the practice of the present invention.

The oscillographic apparatus combination illustrated in FIG. 1 includes a source, designated by the reference numeral 1, of data representing a phenomenon under observation and which it is desired to study and analyze. Source 1 is connected by conductors 2, 3 and 4 and by respectively associated manually operable switches 5, 6 and 7 to the inputs of an indicating oscillographic device 8, a magnetic tape loop storage device 9, and a recording oscillographic device 10. The output of the magnetic tape loop 9, additionally, is adapted to be connected by a conductor 11 and associated switch 12 to the input of indicating oscillographic device 8, and by a conductor 13 and switch 14 to the input of the recording oscillographic device 10.

The oscillograph recorder 10 illustrated in FIG. 2 includes a housing or compartment, not shown, containing a supply reel 15 and a take-up reel 16 for the roll of sensitive recording paper or chart material 17. An electric motor, not shown, actuates these reels and is controlled by a suitable switch, located on the front panel, not shown, of the oscillograph, as is disclosed, for example, in the application for United States patent filed on September 8, 1958 by R. S. Kampf, and bearing Serial No. 759,675. It will be apparent that in some cases, the take-up reel 16 may not be necessary or desirable, and in such cases, the take-up reel 16 may be dispensed with and the recording paper may be permitted to spill out over the table or panel on which the oscillograph is mounted and onto the floor.

In a recording-plane region between the reels, with which a longitudinal beam-deflecting mirror 18 is associated, mirror 18 extending substantially across the width of the recording paper 17, the recording paper 17 is exposed to a plurality of recording beams 19 of radiation each coming from a respectively associated galvanometer designated generally at 20. Desirably, mirror 18 is provided with an elliptical reflecting surface such as is disclosed in the copending application Serial No. 86,219, filed on January 31, 1961, by Norman L. Stauffer, which mirror is effective to focus each of the galvanometer beams into a spot of high intensity on the recording paper 17 at the recording plane.

Galvanometers 20 are shown mounted on a galvanometer magnet bank 21 which in practice ordinarily contains 12 galvanometers. It will be understood that any arbitrary number of such galvanometers may be provided. For example, there are three magnet banks containing a total of 36 galvanometers in one apparatus embodiment of the specific oscillograph in which the instant invention is drawn. Each such galvanometer has a small mirror, not shown, deflectable by the associated galvanometer movement that will reflect the recording beam of radiation 19 from a source 22 to that portion of the sensitive recording paper 17 that is at the time at the recording-plane region between the reels.

The source 22 of radiation is a super-high-pressure mercury-vapor lamp enclosed in a quartz envelope and is operable to emit a beam of high intensity ultra-violet radiation. An example of such a lamp is the Osram lamp having a 0.012 inch diameter arc, which lamp is manufactured by the Osram Company in West Germany and is identified as their Model HBO–109. The beam of radiant energy from the lamp 22 is concentrated by a collector lens, not shown, and is directed by suitable optics, not shown, to each of the galvanometer mirrors of the galvanometers 20. The galvanometer mirrors, in turn, reflect the radiant energy, in the form of individual beams back to galvanometer lens, to the mirror 18, and onto the recording paper 17 on the recording plane. While not shown, suitable optics desirably is provided between the lamp 22 and the recording paper 17 as illustrated, for example, in the aforementioned Kampf application Serial No. 759,675, for defining each of the separate reflected galvanometer beams into spots of high intensity on the recording paper. Each spot of radiant energy formed by the associated beam on the recording paper 17 causes a trace which records the variations of the associated phenomenon under observation.

By way of example but not limitation, one form of recording paper 17 which has been found to be particularly useful in the permanent recording oscillograph 10, in the practice of the present invention, is that described in the United States Patent application Serial No. 93,289, filed by Troy A. Scott on March 2, 1961 and assigned to the assignee of the present invention. This form of recording paper is sold by the Heiland Division of the assignee, and is identified as its Part No. A–304796.

Other recording papers which may also be used to advantage in the practice of this invention are those made and sold by Eastman-Kodak Company, and identified as its Kinds 1591 and 1592 and that made and sold by E. I. du Pont de Nemours & Co. and identified as its Lino-Writ 5.

The use of such recording paper, referred to in the art as print-out recording paper, gives an immediate image or trace corresponding to the deflections of the recording beams of radiation when the recording beams and recording paper are moving comparatively slow. At higher writing speeds or higher paper transports speeds, a "latent" image or trace is recorded, as in developing-out recording papers requiring wet process developing. This latent recorded image can be "latensified" and thereby made to appear, by exposure to room light. The time of such secondary exposure required to make the trace visible varies in accordance with the speed of writing and the paper transport speed, but ordinarily is no longer than about a minute. The appearance of the latent image or secondary exposure is known in the art as "latensification." For those applications which do not permit a latensification time delay, as described, even though such time is relatively short, forced latensification may be provided as disclosed in either of my copending applications bearing Serial No. 130,808, filed August 11, 1961 and Serial No. 186,750, filed April 11, 1962. Such latensification apparatus and the conventional optical and other devices for producing desired timing and grid lines are not shown nor further described because they form no part of the present invention.

FIG. 3 shows a modification of the oscillographic recorder construction of FIG. 2, which modification is particularly suitable for the indicating oscillographic device 8. As is explained hereinafter, the oscillographic device 8 may be used alone, or in conjunction with the devices 9 and 10 for the purpose of providing a "quick look" at the incoming data to facilitate a decision to discard the data or to retain it for further study and analysis. If desired, a suitable camera attachment designated generally at 24 may be provided to make a photographic record of particularly interesting data which may be observed.

The oscillographic device 8 is made up of parts equivalent to or identical with those of the device illustrated in FIG. 2 except that the recording material or paper 17' is arranged in the form of an endless belt. This recording material or paper 17' does not have the same permanent recording characteristics of the paper 17, but instead contains a phosphorescent material which produces an immediately visible trace upon the incidence of the recording radiation beams on the surface thereof. Such traces preferably are bright initially, but persist for a short time only and may be quenched as for example, by an infrared quench. By way of example, and not limitation, the endless belt 17' may comprise a suitable coating of phosphor identified as Type IR–3431 manufactured by U.S. Radium Corporation, although other phosphorescent or fluorescing substances may also be employed, if desired. Type IR–3431 is employed in an apparatus embodiment of the indicating oscillographic device 8 of the present invention and provides satisfactory initial brightness as well as excellent quenching, as for example, by the application of heat which may be derived from a suitably energized globar unit designated 23. This unit 23 is disposed closely adjacent the surface of the endless belt 17' at a point beyond the surface of the belt which may be observed thereby to erase the trace or traces and to provide a fresh indicating surface as the erased portion of the endless belt moves again into the indicating and recording plane region of the oscillographic device.

The magnetic tape loop device 9 illustrated diagrammatically in FIG. 4 comprises an endless magnetic recording path such as the tape 25 which is continuously driven around rollers 26 and 27 at a constant rate of speed by an electric motor M. A recording head 28, a reproducing or output head 29, and an obliterating or erase head 30 are associated with the magnetic tape 25. As shown, the erase head 30 is disposed between the recording head 28 and the reproducing head 29, and is selectively energizable by conductor 31 in which a switch 32 is connected from a source of erasing current designated at 33. With both of the switches 6 and 32 opened, the data stored on the tape 25 may repetitively be read out by the reproducing head 29.

While only single recording, reproducing and erasing heads are shown, it will be understood that additional recording, reproducing and erasing heads may be provided, as desired. As shown, the recording head 28 is arranged to be connected by switch 6 and conductor 3 to the source 1 of the input data. This connection is made in such a manner that the data input signal derived from source 1 will be recorded on the tape 25.

As those skilled in the art will understand, the connection lead 4 and each of the connecting leads 2, 3, 11 and 13, also, may include suitable amplifying or impedance matching devices as may be necessary to meet the requirements of the particular system under investigation. Additionally, in instances where the input data signal or the signal being displayed, stored or recorded is not compatible with the displaying, storing or recording device, a suitable signal conditioner of known type may be incorporated in the said connecting leads.

The obliterating or erase head 30 is provided in association with the magnetic tape 25 and positioned between the recording head 28 and the reproducing head 29 for obliterating the signal on a portion of the tape just before that portion reaches the recording head 28.

The reproducing head 29 is provided to reproduce the signals recorded on the tape 25. The signal picked up by the reproducing head 29 is arranged to be applied either by way of conductor 11 and switch 12 to the input of the indicating oscillographic device 28, or by way of conductor 13 and switch 14 to the input of the permanent recording oscillographic device 10.

In the utilization of the oscillographic displaying, storing and recording apparatus combination illustrated in FIG. 1 to provide a visual display of the present and recent history of a continuing phenomenon, switches 5 and 6 would be thrown to their closed positions, the other switches being adjusted to their opened positions. With this adjustment of the switches, data from the source 1 would be stored in the magnetic tape 25 and erased again as new data are stored. Simultaneously, a visual display of the data would be provided by the indicating oscillographic device 8. If it were desired by the observer to have a delayed play-back of the input data, this result can be accomplished by opening switches 5, 6 and 32 and closing switch 12. With switches 6 and 32 opened, the data recorded on the magnetic tape 25 is not erased, and can be played back repeatedly, as many times as desired. The recording oscillographic device 10 can directly record incoming data from source 1 with switch 7 closed. Alternatively, the recording oscillographic device 10 can record stored data from the magnetic tape 25 if switch 7 is opened and switch 14 is closed.

One contemplated form of the operation is as follows: With switches 5 and 6 closed, the operator views the traces which are temporarily displayed on the recording material or paper 17' of the indicating oscillographic device 8. If interesting data are observed, the operator may open switches 5, 6 and 32, and close switch 12. This allows him to examine repeatedly the data of interest which appears on the recording paper 17' of oscillograph 8. If the data observed are sufficiently interesting, the operator can close switch 14, the switch 7 then being opened, so as to record the data permanently on the recording paper or material 17 of the permanent recording oscillograph 10. Additionally, the operator can make a photograph of the observed data on device 8 by actuating camera 24. Such a camera may be a high speed camera, if desired, thereby making it unnecessary to stop the endless recording chart 17' when photographing the displayed traces. Alternatively, suitable means of known type including a ready manipulatable switch may be provided to stop the chart 17' when making a photograph of the information.

It is contemplated that each of the devices 8, 9 and 10 may have two or more channels, as desired. In the oscillographic devices 8 and 10, as many channels can be obtained as there are galvanometers. In the case of the magnetic tape loop 9, as illustrated in FIG. 4, it is necessary in order to obtain additional channels only to provide additional recording heads and reproducing heads with appropriate obliterating or erase heads, and appropriate electronic circuitry for each channel, in a manner well known in the art. Additionally, it is contemplated that switching would be provided in association with each channel in the manner illustrated in FIG. 1.

With such a multi-channel arrangement, it is contemplated that the observer might play back on the indicating oscillographic device 8 data stored on magnetic tape 25, performing the above-described operations, while continuing to observe new data coming in from source 1, now on a new channel. If such new incoming data were found sufficiently interesting, the observer might find it desirable directly to make a permanent record of such data. This result can be accomplished by closing switch 7 and thereby making a record of the variations of the data on the recording oscillographic device 10. At the same time, the observer might find it desirable to make a permanent record of the data being observed on the indicating oscillographic device 8. This result can be accomplished by closing a switch 14 to another galvanometer or channel in the recording oscillographic device 10.

It will be apparent from the foregoing description that there has been provided, according to the present invention, a novel combination of oscillographic indicating and recording apparatus for providing a visually observable display and permanent record, if desired, of the recent and current history of an ongoing phenomenon. This combination, moreover, at the judgment of the observer, permits data of no value to be discarded and data of interest to be repeatedly examined visually and/or to be recorded for subsequent study and detailed analysis. Additionally, the observer can stop the endless recording material or belt of the indicating oscillographic device and photograph any phenomenon after that phenomenon has occurred and after the observer has determined that it is of interest. It is apparent, additionally, that the phosphor recording medium of the indicating oscillographic device gives essentially instantaneous viewing of the recorded signal. This eliminates the delay in viewing information which ordinarily is encountered in the use of the prior art devices. Moreover, as those skilled in the art will understand, the channel capacity of the temporary and permanent recording oscillographs and also of the magnetic tape recorded inherently are very high. This permits a substantial and desired increase in the amount of information which may be displayed, observed and recorded with regard to any incoming data.

What is claimed is:

1. Data display apparatus comprising a data input portion, an indicating oscillographic device, a data storage device, a recording oscillographic device, individual circuit path means from said data input portion to each of said devices, switch means associated with each of said circuit path means for selectively applying a signal from said data input portion to each of said devices, separate circuit path means connected between the output of said storage device and the input of said indicating oscillographic device and said recording oscillographic device, and separate switching means associated with each of said last-mentioned circuit path means for selectively connecting the output of said storage device to said indicating oscillographic device and said recording oscillographic device.

2. An apparatus combination as specified in claim 1 wherein said indicating oscillographic device comprises an endless phosphorescent viewing belt, at least one deflecting-type galvanometer device to which said signal is adapted to be applied, and means for forming a beam of radiation which is deflectable in accordance with the deflecting of said galvanometer device to form on said belt a viewable trace representing the variations in said signal.

3. An apparatus combination as specified in claim 2 wherein said indicating oscillographic device includes additional galvanometer devices to which additional signals from said data input portion may be applied, and additional switch means associated with said additional galvanometer devices for selectively controlling the application of said additional signals to said galvanometer devices.

4. An apparatus combination as specified in claim 1 wherein said storage device comprises a magnetic tape loop, means to drive said tape loop at a substantially constant speed, and at least one record head, one reproduce head, and one erase head associated with said magnetic tape loop.

5. An apparatus combination as specified in claim 4 including a source of erase current and switching means selectively to energize said erase head from said source of erase current.

6. An apparatus combination as specified in claim 1 wherein said recording oscillographic device includes at least one deflecting-type galvanometer device to which said signal is adapted to be applied, means including said galvanometer device forming a recording radiation beam principally in the invisible portion of the spectrum, and a recording paper coated with an emulsion primarily responsive to such radiations and on which said recording radiation beam is incident in a spot of high intensity whereby a trace of the relative movement of said spot and said recording paper becomes immediately visible.

7. An apparatus combination as specified in claim 1 wherein said indicating oscillographic device includes additional galvanometer devices to which additional signals from said data input portion may be applied, additional switch means associated with said additional galvanometer devices for selectively controlling the application of said additional signals to said galvanometer devices, and wherein said recording oscillographic device includes at least deflecting-type galvanometer device to which said signal is adapted to be applied, means including said last-mentioned galvanometer device forming a recording radiation beam, and a recording paper coated with an emulsion responsive to such radiation and upon which said radiation beam is incident in a spot of high intensity, whereby a trace of the relative movement of said spot and said recording paper becomes immediately visible.

8. An apparatus combination as specified in claim 7 wherein said recording oscillographic device includes additional galvanometer devices to which additional signals from said data input portion may be applied, and additional switch means associated with said additional galvanometer devices for selectively controlling the application of said additional signals to said last-mentioned galvanometer devices.

9. An apparatus combination as specified in claim 8 wherein said storage device comprises a magnetic tape loop, means to drive said tape loop at a substantially constant speed, additional recording heads associated with said magnetic tape loop and to which additional signals from said data input portion may be applied, corresponding additional reproduce and erase heads associated with said magnetic tape loop, and additional switch means associated with said additional record, reproduce, and erase heads for selectively controlling the application of said additional signals to said record heads, and for selectively connecting said additional reproduce heads to said additional galvanometer devices in said indicating oscillographic device and in said recording oscillographic device and for selectively applying erase current to said additional erase heads.

References Cited by the Examiner
UNITED STATES PATENTS

| | | | |
|---|---|---|---|
| 2,845,615 | 7/58 | Bowman | 340—15.5 X |
| 2,879,860 | 3/59 | Tilley | 181—.5 |
| 2,889,000 | 6/59 | Silverman et al. | 181—.5 |
| 2,950,459 | 8/60 | Loper et al. | 346—33 |
| 2,997,690 | 8/61 | Evans | 340—15.5 |
| 3,066,299 | 11/62 | Kampf | 346—109 |

LEO SMILOW, *Primary Examiner.*